US00RE41905E

(19) United States
(12) Reissued Patent
Fleming, III

(10) Patent Number: US RE41,905 E
(45) Date of Reissued Patent: *Nov. 2, 2010

(54) INTELLIGENT RADAR DETECTOR

(76) Inventor: Hoyt A. Fleming, III, 4134 W. Quail Ridge Dr., Boise, ID (US) 83703

(*) Notice: This patent is subject to a terminal disclaimer.

(21) Appl. No.: 11/924,352

(22) Filed: Oct. 25, 2007

Related U.S. Patent Documents

Reissue of:
(64) Patent No.: 6,204,798
Issued: Mar. 20, 2001
Appl. No.: 09/292,089
Filed: Apr. 14, 1999

U.S. Applications:
(63) Continuation of application No. 11/196,841, filed on Aug. 2, 2005, now Pat. No. Re. 40,653, which is a continuation of application No. 10/352,679, filed on Jan. 28, 2003, now Pat. No. Re. 39,038.

(51) Int. Cl.
*G01S 7/40* (2006.01)
G01S 5/14; G01S 7/02

(52) U.S. Cl. ..... 342/20; 342/52; 342/89; 342/195; 342/357.22

(58) Field of Classification Search ..... 342/20, 342/27, 28, 52, 73, 89–93, 104, 105, 109, 342/115, 118, 159, 165, 175, 195, 357.01, 342/357.06, 357.1, 357.13, 357.17, 13–19, 342/385, 417, 428, 431, 432, 440–449, 147, 342/450–465
See application file for complete search history.

(56) References Cited

U.S. PATENT DOCUMENTS

| | | | | |
|---|---|---|---|---|
| 3,660,844 A | | 5/1972 | Potter | 343/18 E |
| 4,025,920 A | * | 5/1977 | Reitboeck et al. | 342/13 |
| 4,182,990 A | | 1/1980 | Coffin et al. | |
| 4,275,399 A | * | 6/1981 | Marom | 342/147 |
| 4,313,216 A | | 1/1982 | Jaeger et al. | 455/226 |
| 4,315,261 A | | 2/1982 | Mosher | |
| 4,581,769 A | | 4/1986 | Grimsley | |
| 4,631,542 A | | 12/1986 | Grimsley | |
| 4,725,840 A | | 2/1988 | Orazietti | |
| 4,750,215 A | | 6/1988 | Biggs | 455/226 |
| 4,817,000 A | | 3/1989 | Eberhardt | |
| 4,841,302 A | | 6/1989 | Henry | |
| 4,887,086 A | | 12/1989 | Unser et al. | |

(Continued)

FOREIGN PATENT DOCUMENTS

| | | |
|---|---|---|
| DE | 3411832 | 3/1984 |
| FR | 2776778 | 3/1998 |
| GB | 843590 | 11/1958 |
| GB | 2320384 | 12/1996 |
| JP | 55-013887 | 1/1980 |
| JP | 01-260386 | 10/1989 |
| JP | H9-27096 | 7/1995 |
| JP | 9-27096 | 1/1997 |
| JP | 9-27096 A | 1/1997 |
| JP | 10142330 A | 5/1998 |
| WO | WO 97/43651 | 11/1997 |
| WO | WO 00/77539 | 6/2000 |

OTHER PUBLICATIONS

U.S. Appl. No. 60/139,097, filed Jun. 1999, Steven K. Orr.
U.S. Appl. No. 60/145,394, filed Jul. 1999, Steven K. Orr.

(Continued)

*Primary Examiner*—Bernarr E Gregory

(57) ABSTRACT

A radar detector for alerting an operator of a motor vehicle to an incoming police radar signal. This radar detector includes a microprocessor; a circuit coupled to the microprocessor for detecting the incoming police radar signal; and a global positioning system receiver coupled to the microprocessor. Upon detection of an incoming radar signal, the radar detector can utilize the position, velocity, and/or heading data from the global positioning system receiver to determine whether to generate an alert.

29 Claims, 2 Drawing Sheets

U.S. PATENT DOCUMENTS

| | | | | | |
|---|---|---|---|---|---|
| 4,906,999 | A | | 3/1990 | Harrah et al. | 342/20 |
| 4,935,742 | A | | 6/1990 | Marin | |
| 4,949,088 | A | | 8/1990 | Ryan et al. | 342/20 |
| 4,978,963 | A | * | 12/1990 | Thorpe | 342/433 |
| 5,001,777 | A | * | 3/1991 | Liautaud | 342/20 |
| 5,049,884 | A | | 9/1991 | Jaeger et al. | |
| 5,068,663 | A | | 11/1991 | Valentine et al. | 342/20 |
| 5,083,129 | A | | 1/1992 | Valentine et al. | 342/20 |
| 5,146,226 | A | | 9/1992 | Valentine et al. | |
| 5,151,701 | A | | 9/1992 | Valentine et al. | 342/20 |
| 5,159,345 | A | | 10/1992 | Young | |
| 5,164,729 | A | | 11/1992 | Decker | |
| 5,206,500 | A | | 4/1993 | Decker | |
| 5,250,951 | A | | 10/1993 | Valentine et al. | 342/20 |
| 5,300,932 | A | | 4/1994 | Valentine | |
| 5,305,007 | A | | 4/1994 | Orr et al. | |
| 5,315,302 | A | | 5/1994 | Katsukura et al. | |
| 5,347,120 | A | | 9/1994 | Decker | |
| 5,365,055 | A | | 11/1994 | Decker | |
| 5,485,161 | A | | 1/1996 | Vaughn | |
| 5,510,793 | A | | 4/1996 | Gregg et al. | |
| 5,515,042 | A | | 5/1996 | Nelson | |
| 5,530,447 | A | | 6/1996 | Henderson | |
| 5,559,508 | A | | 9/1996 | Orr | |
| 5,574,469 | A | | 11/1996 | Hsu | |
| 5,668,554 | A | | 9/1997 | Orr | |
| 5,684,476 | A | | 11/1997 | Anderson | |
| 5,812,092 | A | * | 9/1998 | Auger et al. | 342/441 |
| 5,835,052 | A | | 11/1998 | Iwakuni | |
| 5,900,832 | A | | 5/1999 | Valentine et al. | |
| 5,907,293 | A | | 5/1999 | Tognazzini | |
| 5,917,430 | A | | 6/1999 | Greneker et al. | |
| 5,917,441 | A | | 6/1999 | Valentine et al. | |
| 5,977,884 | A | | 11/1999 | Ross | 340/936 |
| 5,990,821 | A | | 11/1999 | Sakar | |
| 6,049,301 | A | | 4/2000 | Weagant | 342/20 |
| 6,069,580 | A | | 5/2000 | Martinson | |
| 6,118,403 | A | | 9/2000 | Lang | 342/20 |
| 6,175,325 | B1 | | 1/2001 | Ono | |
| 6,201,493 | B1 | | 3/2001 | Silverman | |
| 6,246,948 | B1 | | 6/2001 | Thakker | |
| 6,252,544 | B1 | | 6/2001 | Hoffberg | 342/357.1 |
| 6,285,317 | B1 | | 9/2001 | Ong | |
| 6,384,776 | B1 | | 5/2002 | Martin | |
| 6,392,661 | B1 | | 5/2002 | Tankersley | |
| 6,400,308 | B1 | | 6/2002 | Bell et al. | |
| 6,449,540 | B1 | | 9/2002 | Rayner | |
| 6,614,385 | B2 | | 9/2003 | Kuhn | |
| 6,670,905 | B1 | | 12/2003 | Orr | 342/20 |
| 6,853,849 | B1 | | 2/2005 | Tognazzini | |
| RE39,038 | E | | 3/2006 | Fleming, III | 342/20 |
| RE40,653 | E | | 3/2009 | Fleming, III | |
| 2001/0002451 | A1 | | 5/2001 | Breed | |
| 2001/0006372 | A1 | | 7/2001 | Lemelson | |
| 2001/0012775 | A1 | | 8/2001 | Modzelesky | |
| 2002/0022927 | A1 | | 2/2002 | Lemelson | |
| 2002/0133294 | A1 | | 9/2002 | Farmakis | |
| 2003/0218562 | A1 | | 11/2003 | Orr | |

OTHER PUBLICATIONS

Poteet, David C. "RadioSat". [online], [retrieved on Apr. 10, 2000]. Retrieved from the Internet <URL: http://newcitymedia.com/radiosat/radiosat/radiosat/index.html>.

"Buyers Guide: Compass Radar Detectors". [online], [retrieved on May 7, 2007]. Retrieved from the Internet <URL: http://www.radarbusters.com/support/buyers–guide/usa/radar__compass.asp>.

Dr. Tom J. Chalko, "High accuracy speed measurement using GPS (Global Positioning System)"; Scientific Engineering Research P/L; Mount Best, Victoria, Australia; no date listed; copyright in the year 2007.

Greneker, Gene, "Millimeter Wave Safety Warning System for In–Vehicle Signing", IEEE AES Systems Magazine, Jul. 1998, pp. 7–12.

"Radar detectors warn drivers of highway hazards", [online], [retrieved on May 18, 2009]. Retrieved from the Internet <URL: http//americancityandcounty.com/mag/government__radar__detectors__warn/>.

Fisher, P. David, "Improving on Police Radar", IEEE Spectrum, Jul. 1992, pp. 38–43.

Smith, Chester L., "Trends in Covert Applications of Electrotechnology", IEEE Technology and Society Magazine, Summer 1991, pp. 15–21.

"*An Integrated INS/GPS Approach to the Georeferencing of Remotely Sensed Data*", Photogrammetric Engineering & Remote Sensing, vol. 59, No. 11, Nov. 1993, pp. 1667–1674.

"The Electronics Handbook", 1996 pp. 1663–1733.

Complaint, Mar. 10, 2009, in *Hoyt A. Fleming* v. *Escort Inc.* and *Beltronics USA,* U.S. District Court for the District of Idaho, Case1:09–cv–00105–BLM.

Defendants' Motion To Transfer Complaint Pursuant To 28 U.S.C. § 1404(a), Apr. 14, 2009, in *Hoyt A. Fleming* v. *Escort Inc.* and *Beltronics USA, Inc.,* U.S. District Court for the District of Idaho, Case1:09–cv–00105–BLM.

Defendants'Motion To Dismiss, Apr. 14, 2009, in *Hoyt A. Fleming* v. *Escort Inc.* and *Beltronics USA, Inc.,* U.S. District Court for the District of Idaho, Case1:09–cv–00105–BLM.

Response to Defendants' Motion to Dismiss Filed on Apr. 14, 2009, Apr. 29, 2009, in *Hoyt A. Fleming* v. *Escort Inc.* and *Beltronics USA, Inc.,* U.S. District Court for the District of Idaho, Case1:09–cv–00105–BLM.

Plaintiff's Response to Defendants' Motion to Transfer Filed on Apr. 14, 2009, Apr. 29, 2009, in *Hoyt A. Fleming* v. *Escort Inc.* and *Beltronics USA, Inc.,* U.S. District Court for the District of Idaho, Case1:09–cv–00105–BLM.

Defendants' Reply In Support Of Their Motion To Transfer Complaint Pursuant To 28 U.S.C. § 1404(a) May 18, 2009, in *Hoyt A. Fleming* v. *Escort Inc.* and *Beltronics USA, Inc.,* U.S. District Court for the District of Idaho, Case1:09–cv–00105–BLM.

Defendants' Reply In Support Of Their Motion To Dismiss Pursuant To Rule 12(b)(6) and Rule 12 (b) (7) May 18, 2009, in *Hoyt A. Fleming* v. *Escort Inc.* and *Beltronics USA, Inc.,* U.S. District Court for the District of Idaho, Case1:09–cv–00105–BLM.

Order On Motions To: (1) Dismiss, and (2) Transfer, Jun. 11, 2009, in *Hoyt A. Fleming* v. *Escort Inc.* and *Beltronics USA, Inc.,* U.S. District Court for the District of Idaho, Case1:09–cv–00105–BLM.

Defendants' Answer to Complaint and Counterclaim, Jun. 22, 2009, in *Hoyt A. Fleming* v. *Escort Inc.* and *Beltronics USA, Inc.,* U.S. District Court for the District of Idaho, Case1:09–cv–00105–BLM.

Defendants' First Amended Answer to Complaint and Counterclaim, Jun. 29, 2009, in *Hoyt A. Fleming* v. *Escort Inc.* and *Beltronics USA, Inc.,* U.S. District Court for the District of Idaho, Case1:09–cv–00105–BLM.

Defendant's Patent Invalidity Contentions, Jul. 2, 2009, in *Hoyt A. Fleming* v. *Escort Inc.* and *Beltronics USA, Inc.,* U.S. District Court for the District of Idaho, Case1:09–cv–00105–BLM.

Plaintoff Hoyt A. Fleming's Response to Defendants' First Set of Interrogatories.

File History for U.S. Appl. No. 10–396–881.

File History for U.S. Patent No. 6,204,798.

File History for U.S. Patent No. RE39,038.

File History for U.S. Patent No. RE40,653.

Compliant for Breach Of Contract: Extortion, Feb. 22, 2008, in *Hoyt A. Fleming* v. *Tom Coverstone,* U.S. District Court Southern District of California, Case 3:08–cv–00355–WQH–NLS.

First Amended Complaint For Breach Of Contract; Extortion: Defamation, Mar. 12, 2008, in *Hoyt A. Fleming* v. *Tom Coverstone,* U.S. District Court Southern District of California, Case 3:08–cv–00355–WQH–NLS.

Notice of Special Motion and Special Motion To Strike Pursuant to Code Of Civil Procedure Section 425.16, Jun. 18, 2008, in *Hoyt A. Fleming* v. *Tom Coverstone,* U.S. District Court Southern District of California, Case3 :08–cv–00355–WQH–NLS.

Notice of Motion and Motion to Dismiss Plaintiff's First Amended Complaint Pursuant To Federal Rules Of Civil Procedure 12(b)(6) and 12(b)(7), Jun. 18, 2008, in *Hoyt A. Fleming* v. *Tom Coverstone,* U.S. District Court Southern District of California, Case3:08–cv–00355–WQH–NLS.

Memorandum in Opposition To Defendant's Special Motion To Strike Pursuant To Cal. Code Of Civ. Proc. Section 325.16, Jul. 7, 2008, in *Hoyt A. Fleming* v. *Tom Coverstone,* U.S. District Court Southern District of California, Case 3:08–cv–00355–WQH–NLS.

Reply To Plaintoff's Opposition To Defendant's Special Motion To Strike, Jul. 14, 2008, in *Hoyt A. Fleming* v. *Tom Coverstone,* U.S. District Court Southern District of California, Case 3:08–cv–00355–WQH–NLS.

Defendant Tom Coverstone's Answer and Counterclaim To Plaintoff's Second Amended Complaint, Mar. 30, 2009, in *Hoyt A. Fleming* v. *Tom Coverstone,* U.S. District Court Southern District of California, Case3:08–cv–00355–WQH–NLS.

Answer to Counterclaim, Apr. 7, 2009, in *Hoyt A. Fleming* v. *Tom Coverstone,* U.S. District Court Southern District of California, Case3:08–cv–00355–WQH–NLS.

Transcript of Proceeding held on Jun. 4, 2009 before Judge Tashima, in *Hoyt A. Fleming* v. *Escort Inc.*and *Beltronics USA, Inc.,* U.S. District Court for the District of Idaho, Case1:09–cv–00105–BLM.

Plaintoff's Answer to Defendants' First Amended Counterclaims, in *Hoyt A. Fleming* v. *Escort Inc.*and *Beltronics USA, Inc.,* U.S. District Court for the District of Idaho, Case1:09–cv–00105–BLM.

Joint Claim Construction and Prehearing Statement, in *Hoyt A. Fleming* v. *Escort Inc.*and*Beltronics USA, Inc.,* U.S. District Court for the District of Idaho, Case1:09–cv–00105–BLM.

Defendants' Opening Claim Construction Brief, in *Hoyt A. Fleming* v. *Escort Inc.*and *Beltonics USA, Inc.,* U.S. District Court for the District of Idaho, Case1:09–cv–00105–BLM.

Plaintiff's Opening Claim Construction Brief, in *Hoyt A. Fleming* v. *Escort Inc.*and *Beltronics USA, Inc.,* U.S. District Court for the District of Idaho, Case1:09–cv–00105–BLM.

Defendants' Response to Plaintiff's Opening Claim Construction Brief, in *Hoyt A. Fleming* v. *Escort Inc.* and *Beltronics USA, Inc.,* U.S. District Court for the District of Idaho, Case1:09–cv–00105–BLM.

Plaintiff's Responsive Claim Construction Brief, in *Hoyt A. Fleming* v. *Escort Inc.*and *Beltronics USA, Inc.,* U.S. District Court for the District of Idaho, Case1:09–cv–00105–BLM.

Defendants' Reply to Plaintiff's Responsive Claim Construction Brief, in *Hoyt A. Fleming* v. *Escort Inc.*and *Beltronics USA, Inc.,* U.S. District Court for the District of Idaho, Case1:09–cv–00105–BLM.

Plaintiff's Reply Claim Construction Brief, in *Hoyt A. Fleming* v. *Escort Inc.*and *Beltronics USA, Inc.,* U.S. District Court for the District of Idaho, Case1:09–cv–00105–BLM.

Defendants' Motion for Leave of Court to Amend Defendant's patent Invalidity Contentions, in *Hoyt A. Fleming* v. *Escort Inc.* and *Beltronics USA, Inc.,* U.S. District Court for the District of Idaho, Case1:09–cv–00105–BLM.

Deposition transcript of Hoyt Fleming, vol. 1, in *Hoyt A. Fleming* v. *Tom Coverstone,* U.S. District Court Southern District of California, Case 3:08–cv–00355–WQH–NLS.

Deposition transcript of Hoyt Fleming, vol. 2, in *Hoyt A. Fleming* v. *Tom Coverstone,* U.S. District Court Southern District of California, Case 3:08–cv–00355–WQH–NLS.

Order, in *Hoyt A. Fleming* v. *Escort Inc.*and *Beltronics USA, Inc.,* U.S. District Court for the District of Idaho, Case1:09–cv–00105–BLM.

* cited by examiner

INTELLIGENT RADAR DETECTOR

Matter enclosed in heavy brackets [ ] appears in the original patent but forms no part of this reissue specification; matter printed in italics indicates the additions made by reissue.

*This application is a reissue continuation of U.S. patent application Ser. No. 11/196,841, filed on Aug. 2, 2005, which is a reissue continuation of U.S. patent application Ser. No. 10/352,679, filed on Jan. 28, 2003, which is a Reissue of U.S. Pat. No. 6,204,798, which issued from U.S. patent application Ser. No. 09/292,089, filed on Apr. 14, 1999. More than one reissue application has been filed for the reissue of U.S. Pat. No. 6,204,798. The reissue applications are application Ser. Nos. 10/352,679, 11/196,841, and 11/924,352.*

1. BACKGROUND

The present invention relates generally to police radar detectors used in motor vehicles and, more particularly, to police radar detectors that utilize a motor vehicle's position, velocity and/or heading to minimize false alarms.

Many operators of motor vehicles utilize radar detectors to alert them to the fact that their speed is being monitored by law enforcement agencies. However, conventional radar detectors often generate "false alarms." These false alarms are annoying to the operators of motor vehicles. In fact, various automotive publications publish results of "false alarm" tests. Thus, anything that can be accomplished by the manufacturer to reduce the number of false alarms without reducing detection of police radar is commercially valuable.

In addition to police radar signals, there are many different sources of microwave signals in the frequency bands allocated to police radar by the U.S. Federal Communications Commission (FCC). For example, motion-detecting burglar alarms and automatic door openers also operate in the frequency bands allocated to police radar. Thus, a need exists for a radar detector that can distinguish between signals generated by a police radar transmitter and those generated by other devices which utilize microwave signals within the same frequency bands.

Still another source of annoying false alarms occurs when an operator of a motor vehicle is travelling at a speed that is below the legal speed limit, such as occurs when the operator is in traffic, and the radar detector alerts him to an incoming radar signal. Even if a police radar signal is monitoring the speed of the operator's vehicle, because the velocity of the vehicle is below the legal speed limit, the operator of the vehicle may not need to be alerted to the presence of the police radar signal. Thus, a need exists for a radar detector that does not generate an alert if the velocity of the radar detector is below the legal speed limit.

Operators have become accustomed to radar detectors activating in certain locations along commonly traveled streets and highways. Police radar units may be deployed by the side of the roadway at these locations since the police also are aware of the local activation signals and the police are aware that the signals tend to mask their own speed monitoring radar units. Thus, a need exists for a radar detector that can avoid generating a false alarm due to such accustomed radar signals while still generating an alert for such police radar signals.

2. SUMMARY OF THE INVENTION

One embodiment is a radar detector for alerting an operator of a motor vehicle to an incoming police radar signal. This radar detector includes a microprocessor; a circuit coupled to the microprocessor for detecting the incoming police radar signal; and a global positioning system receiver coupled to the microprocessor. The radar detector also includes a program storage device containing instructions for determining whether to generate an alert to an incoming radar signal based upon the radar detector's position, velocity, and/or heading.

Another embodiment of the invention is a method of generating an alert to an incoming radar signal. This method includes first detecting the incoming radar signal. Next, the position of a radar detector is determined. Then, an alert is generated if the position of the radar detector is not within a predetermined distance of a predetermined position.

Still another embodiment of the invention is a second method of generating an alert to an incoming radar signal. This method includes first detecting the incoming radar signal. Next, the velocity of the radar detector is determined. Then, an alert is generated if the velocity of a radar detector is greater than a predetermined velocity.

3. DETAILED DESCRIPTION OF THE PREFERRED EMBODIMENTS

3.1 Description of a First Embodiment

Figure 1:
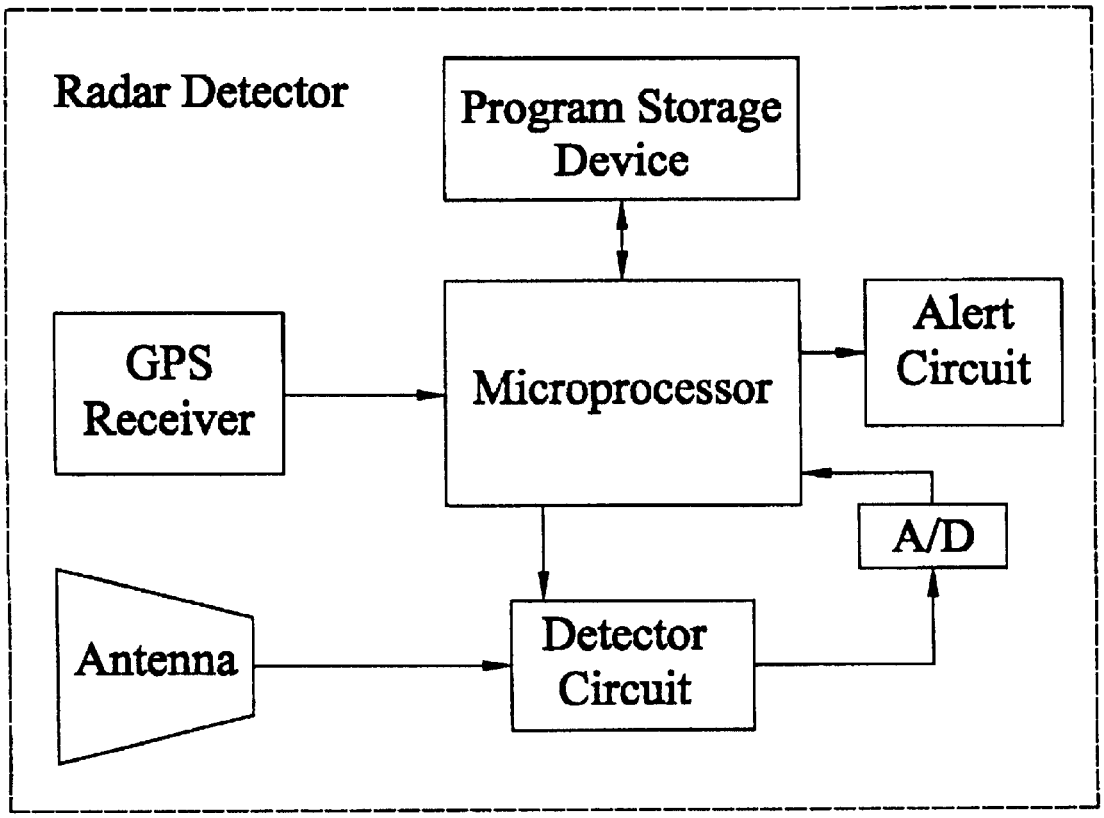
FIG. 1 is a block diagram of a radar detector including one embodiment of the present invention.

One embodiment of the novel radar detector is shown in FIG. 1. The radar detector includes an antenna that is coupled to a detector circuit. The detector circuit, which may be controlled by the microprocessor of FIG. 1, collects the signals from the antenna, detects the incoming signals, and distinguishes valid radar signals from electrical noise. The detector circuit may be any appropriate radar detector circuit capable of generating an output signal which indicates the strength, the presence, and/or the frequency of incoming radar signals. While the detector circuit may operate autonomously, operation and control of the detector circuit may be performed by the microprocessor. For example, the microprocessor may control the detector as is known in the art so that radar signals in the different frequency bands allocated to police radar signals are detected. Such detector circuits can take a wide variety of forms and can include amplifiers, mixers, diplexers, and other circuitry commonly used in the radar detector field. Several examples of such circuits are shown in U.S. Pat. Nos. 4,313,216, 5,068,663, and 5,250,951, which are incorporated herein by reference.

The output of the detector circuit is coupled to the input of one or more analog-to-digital converters. These converters convert the analog output of the detector circuit into digital signals that represent signal strength, signal presence, and/or signal frequency.

In addition to being coupled to the detector circuit and the analog-to-digital converter, the microprocessor is also coupled to an alert circuit. The alert circuit communicates information regarding detected radar signals to the operator of a motor vehicle using the radar detector by means of one or more alarm tones and/or visual indicators that are included within the alert circuit. Alert circuits are known by those skilled in the art. For example, see U.S. Pat. Nos.

4,313,216, 5,068,663, and 5,250,951, which are incorporated herein by reference.

The microprocessor, which may be any conventional single or multiple chip microprocessor or digital signal processor, is coupled to a program storage device. The program storage device may be any conventional memory device such as a PROM, EPROM, EEPROM, ROM, SRAM or even battery backed up DRAM. The program storage device contains machine readable instructions that command the microprocessor to perform certain functions. For example, the program storage device may be conventionally programmed to sweep a predetermined number of radar frequency bands, determine the frequency and/or signal strength of any detected radar signals in the swept frequency bands, and, if the signal strength of the detected radar signals exceed a predetermined value, then generate a signal that activates the alert circuit. Such programming is known by those skilled in the art. For example, see U.S. Pat. Nos. 4,313,216, 5,068,663, and 5,250,951, which are incorporated herein by reference.

The microprocessor is also coupled to a positioning system such as a global positioning system ("GPS") receiver. As is well known, a GPS receiver receives signals from satellites and uses these signals to calculate the position of the GPS receiver. In addition, the GPS receiver may receive differential correction data and/or dead reckoning data, such as from a compass or a wheel sensor, to increase the accuracy of the receiver. By calculating the position of the GPS receiver at two different times, the velocity and heading of the GPS receiver can be easily determined using conventional algorithms. Thus, the GPS receiver can provide the microprocessor with data that indicates the position, the velocity, and/or the heading of the radar detector.

The microprocessor may also be coupled to a user interface circuit (not shown). The user interface circuit may include a plurality of buttons that are intended to be depressed by an operator of a motor vehicle. Such buttons may include: a power button, a mute button, a city/highway button, and a dim button.

As will be discussed more fully below, the program storage device may also contain machine readable instructions that command the microprocessor to determine whether to generate an alert based upon data received from the GPS. Thus, upon detection of an incoming radar signal, the radar detector can utilize the position, velocity, and/or heading data from the global positioning system receiver to determine whether to generate an alert.

3.2 Description of a Second Embodiment

Figure 2:
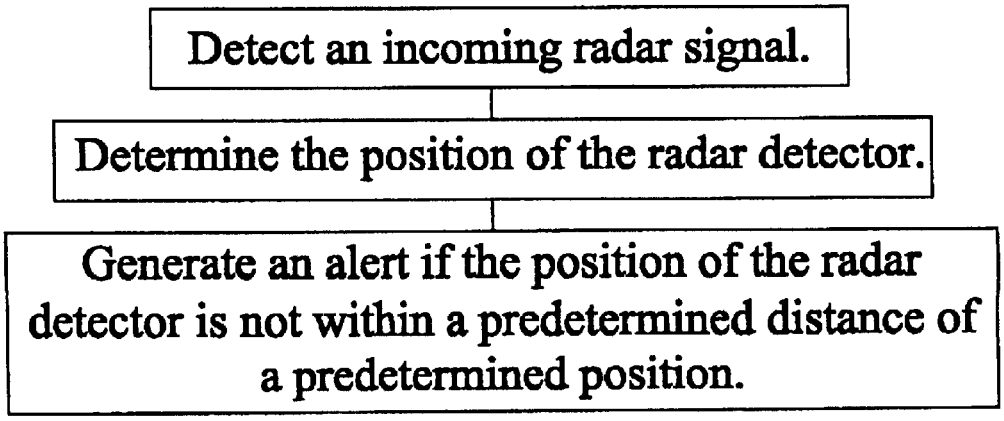
FIG. 2 is a flow diagram of a method of operating a radar detector.

One method of operating the radar detector of FIG. 1 is shown in FIG. 2. In this embodiment, the radar detector first detects an incoming radar signal. Next, the position of the radar detector is determined. Then, an alert is generated if the position of the radar detector is not within a predetermined distance of a predetermined position.

By utilizing the above method, many false alarms may be eliminated. For example, if the position of a microwave automatic door opener is programmed into the radar detector and the radar detector detects an incoming radar signal when the radar detector's position is near the automatic door opener, then it is likely that the source of the incoming radar signal is the automatic door opener and not a police radar. Thus, using the method of FIG. 2, an alert would not be generated for the detected radar signal.

The programming of predetermined positions may be accomplished by depressing one or more buttons that are coupled to the interface circuit discussed above. Thus, if an operator of a motor vehicle approaches a microwave automatic door opener, then the operator can depress an "ignore radar" button. Then, the radar detector would store the position of the radar detector and possibly the frequency and the signal strength of the incoming radar signal in the program storage device of FIG. 1 or another memory device (not shown) coupled to or integrated within the microprocessor. An alternative method of storing such data would be to hold down a "mute" button for an extended length of time such as 3 to 5 seconds. It is also possible to experimentally generate a database containing position, frequency and/or signal strength for a specific geographical region. This database could be provided to operators of motor vehicles for a fee. Accessing the Internet via a cellular phone (not shown) coupled to the microprocessor of FIG. 1 would be one method of providing the above database to operators of motor vehicles.

In still another embodiment, when the operator instructs the radar detector to store a position of an incoming radar signal, the radar detector could attempt to locate the approximate position of the source of the incoming radar signal. For example, if an operator instructs the radar detector to store a position of an incoming radar signal as the operator is still approaching the source of the incoming radar signal, the signal strength of the incoming radar signal will be increasing. The radar detector could locate a position that is very near the position of the source of the incoming radar signal by determining the position of the radar detector when the strength of the incoming signal is at a maximum. In addition, radar detectors such as described in U.S. Pat. No. 5,250,951, may utilize multiple radar antennas and signal processing logic to more accurately determine the position of the source of the incoming radar signal. For example, the position of the source of many incoming radar signals may be closely approximated by the position of a radar detector when the radar detector identifies that the radar source is to the side of the vehicle.

The predetermined distance may also be programmed by the operator of the motor vehicle. If the GPS receiver is receiving differential correction data or is receiving dead reckoning data, then the predetermined distance may be set to a smaller value because the position of the radar detector may be more precisely determined. In addition, if the strength of the incoming radar is strong, the predetermined distance could be set (manually or automatically) to a higher value because the radar detector will detect the incoming radar signal at a greater distance from the source. For example, if a radar detector in a vehicle detected a radar signal while the vehicle traveled a 1 mile distance, then the predetermined distance for that particular radar signal may be calculated by dividing the 1 mile distance in half. In order to compensate for non-symmetrical detection of the radar signal and inaccuracies of the positioning of the radar detector, an additional ¼ or ½ mile might be added to the above predetermined distance.

3.3 Description of a Third Embodiment

Figure 3:
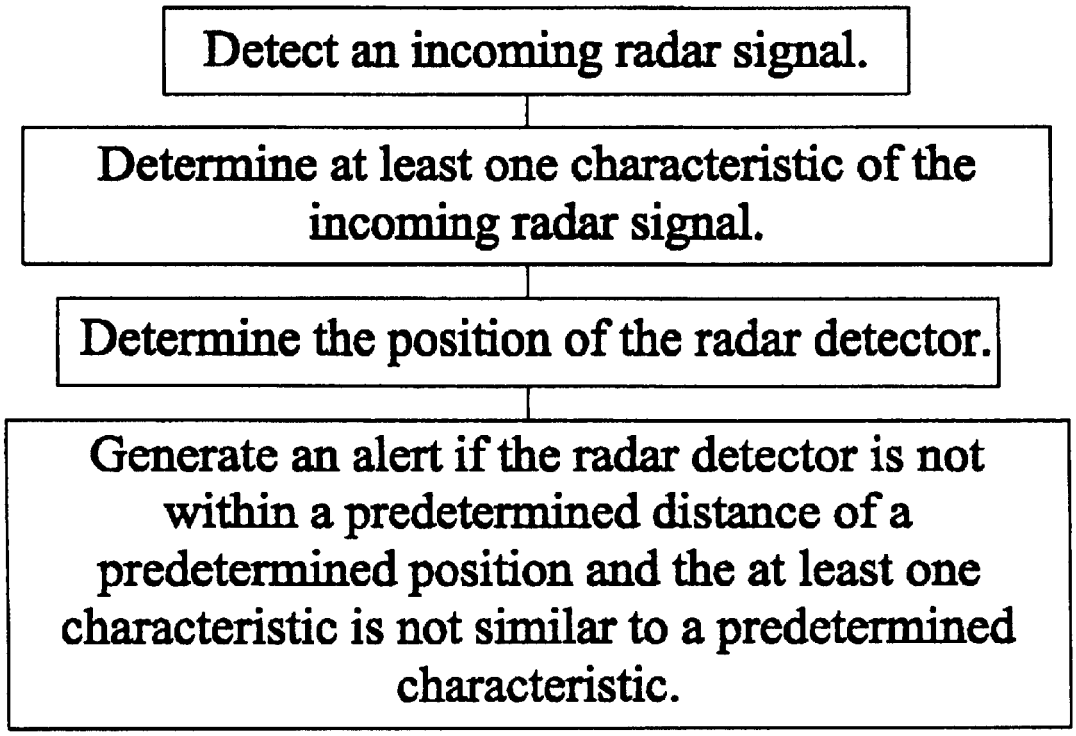
FIG. 3 is a flow diagram of another method of operating a radar detector.

The simple method of operating a radar detector shown in FIG. 2 can be improved as shown in FIG. 3. In this embodiment, the after the radar detects an incoming radar signal it determines a characteristic of the radar signal. For example, the radar detector may determine the frequency and/or the signal strength of the incoming radar signal. Next, the position of the radar detector is determined. Then, an alert is generated if the radar detector is not within a predetermined distance of a predetermined position and the characteristic is not similar to a predetermined characteristic.

By utilizing this method, many false alarms may be eliminated. For example, the location of a microwave automatic door opener and the frequency of the radar signal transmitted by the door opener are first programmed into a radar detector. Assume that a police radar is being transmitted near the location of the microwave automatic door opener. Because the police radar is near the automatic door opener, the method of FIG. 2 would not generate an alert. Thus, the operator of a motor vehicle would not be properly alerted to the police radar. However as shown below, the method of FIG. 3 would generate an alert.

If the automatic door opener signal is processed first according to the method of FIG. 3, then the frequency of the automatic door opener signal would be determined. Next, the position of the radar detector would be determined. Because the radar detector is near the previously programmed position of the automatic door opener and the frequency of the incoming radar signal is equal to the previously programmed frequency of the automatic door opener, the radar detector would not generate an alert.

Next, the police radar signal would be processed. Thus, the frequency of the police radar signal would be determined. However, even though the location of the radar detector is near the previously programmed location of the automatic door opener, because the frequency of the police radar is not equal to the previously programmed frequency of the radar signal transmitted by the door opener, an alert would be generated. Thus, the operator of the motor vehicle would be properly alerted to the presence of the police radar signal.

Due to inaccuracies in algorithms and slight variations in frequencies due to physical phenomena such as temperature of radar transmitters, it may not be practical to determine if a frequency of an incoming radar signal is exactly equal to a previously programmed frequency. Thus, is often sufficient to determine if the frequency of an incoming radar signal is similar to a previously programmed frequency. For example, if two frequencies are within ½, 1, 2, 3, 4, or 5 MHz of each other, then they may be considered to be similar.

In one embodiment of the invention, 256 frequency bins are defined for each frequency band of the radar detector. Thus, this one embodiment of the invention, each of the following frequency bands would have 256 bins: X band (10.475–10.575 GHz); Ku band (13.400–13.500 GHz); K band (24.025–24.275 GHz); and Ka band (34.150–35.250 GHz). In this embodiment, frequencies are considered to be similar if they are in the same frequency band and are in the same bin. In still another embodiment, frequencies are considered to be similar if they are in the same frequency band and are in the same or adjacent bins. In these two embodiments, the exact frequency of the incoming radar signal need not be determined. Only the frequency band and the appropriate frequency bin number need be determined. If higher resolution is required, then the number of bins for one or more frequency bands can be increased. On the other hand, if only very low resolution is required, then if two frequencies are in the same frequency band, they may be considered to be similar.

3.4 Description of a Fourth Embodiment

Figure 4:
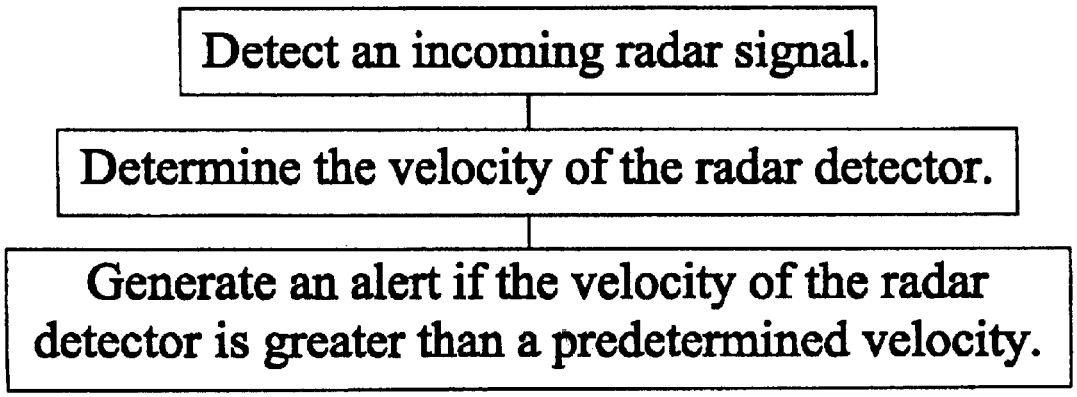
FIG. 4 is a flow diagram of yet another method of operating a radar detector.

FIG. 4 shows still another method of operating the radar detector of FIG. 1. In this embodiment, the radar signal is first detected. Then, the velocity of the radar detector is determined. Next, an alert is generated if the velocity of the radar detector is greater than a predetermined velocity.

This embodiment is particularly useful if the predetermined velocity is set to a value that is less than the minimum speed limit. For example, if an operator of a motor vehicle programs the predetermined velocity to 65 miles per hour, which may be the speed limit on a particular highway, then the operator will not be alerted to a radar signal unless he is speeding. Thus, the operator will not be alerted to radar signals when he is traveling at a slow rate of speed such as when the operator is in traffic. The operator could also program the predetermined velocity to the minimum speed limit that the operator is likely to encounter in a specific geographical region. For example, if the city in which the operator lives has some streets with a 25 miles per hour speed limit, then the operator could program the predetermined speed to 25 miles per hour. If the operator performed such programming, such as by depressing one or more buttons that are coupled to the interface circuit, the operator could be spared some, but not all false alarms.

A more sophisticated embodiment would not require the user to manually program the speed limit. This embodiment would obtain the speed limit from a database that contains speed limits for particular roads in a geographic region. By comparing the location and/or the heading of a motor vehicle to the location and/or heading of a plurality of roads in the above database, the radar detector could determine the particular road upon which the vehicle is traveling. After such a determination, the speed limit for the particular road could be accessed from the database. Such algorithms are known by those skilled in the art. This database could be stored on the program storage device of FIG. 1 or could be stored on an external storage device such as a CD ROM or a hard disk drive. This database could also be provided to operators of motor vehicles for a fee.

3.5 Other Embodiments

In some cases, an operator of a motor vehicle may desire to be alerted to the presence of a radar signal even if the above methods would not "generate an alert." In such cases, a less intrusive alert such as a reduced volume tone, and/or a flashing LED could be generated. Thus, the phrase "generate an alert if" a condition occurs is intended to include generating a particular alert if the condition occurs. If another condition occurs, such as detection of an incoming radar signal while the radar detector is within a predetermined distance of a predetermined position as shown in FIG. 2, then another alert may be generated.

The above Description of the Preferred Embodiments includes words, such as "first," "then," and "next." These words indicate a sequence of acts. Many of the sequences can be modified within the scope of the invention. Thus, unless the result of a first act is required for a second act, then the language indicating a sequence should not be considered to be limitations to the invention.

Many of the above embodiments can be combined to produce a radar detector that generates very few false alarms. For example, the methods of FIG. 2 or FIG. 3 can be combined with the method of FIG. 4. Such combinations are intended to be within the scope of the invention.

I claim:

[1. A method, executed by a device having a position, of generating an alert to an incoming radar signal having a frequency and a signal strength, the method comprising the acts of:

(a) detecting the incoming radar signal;

(b) determining the position of the device that detected the incoming radar signal; and (c) generating an alert if the position of the device is not within a predetermined distance of a predetermined position.]

[2. The method of claim 1 wherein the act of detecting the incoming radar signal includes determining at least one characteristic of the radar signal.]

[3. The method of claim 2 wherein the act of determining at least one characteristic of the radar signal includes determining the frequency of the radar signal.]

[4. The method of claim 2 wherein the act of determining at least one characteristic of the radar signal includes determining a frequency bin number.]

[5. The method of claim 2 wherein the act of determining at least one characteristic of the radar signal includes determining whether the incoming radar signal is in the X frequency band, the Ku frequency band, the K frequency band, or the Ka frequency band.]

[6. The method of claim 2 wherein the act of determining at least one characteristic of the radar signal includes determining the signal strength of the incoming radar signal.]

[7. The method of claim 2 wherein the act of generating an alert includes generating an alert if the at least one characteristic is not similar to a predetermined characteristic.]

[8. The method of claim 1 wherein the act of determining the position of the device includes receiving signals from a plurality of satellites.]

[9. The method of claim 1 wherein the act of determining the position of the device includes receiving a differential global positioning signal.]

[10. The method of claim 1 wherein the act of determining the position of the device includes receiving dead reckoning data.]

[11. A method, executed by a device having a velocity, of generating an alert to an incoming radar signal having a frequency and a signal strength, the method comprising the acts of:

(a) detecting the incoming radar signal;

(b) determining the velocity of the device that detected the incoming radar signal; and (c) generating an alert if the velocity of the device is greater than a predetermined velocity.]

[12. The method of claim 11 wherein the act of determining the velocity of the device includes receiving data from a plurality of satellites.]

[13. The method of claim 11 wherein the act of determining the velocity of the device includes receiving data from a plurality of global positioning satellites.]

[14. The method of claim 11 wherein the act of determining the velocity of the device includes receiving differential global positioning data.]

[15. The method of claim 11 wherein the act of determining the velocity of the device includes receiving dead reckoning data.]

[16. The method of claim 11 wherein the act of generating an alert if the velocity of the device is greater than a predetermined velocity includes generating an alert if the velocity of the device is greater than a velocity that has been previously programmed by an operator of a motor vehicle.]

[17. The method of claim 11 wherein the act of generating an alert if the velocity of the device is greater than a predetermined velocity includes generating an alert if the velocity of the device is greater than a legal speed limit that is retrieved from a database.]

[18. A radar detector for alerting an operator of a motor vehicle to an incoming police radar signal comprising:

(a) a microprocessor;

(b) a circuit coupled to the microprocessor for detecting the incoming police radar signal; and (c) a global positioning system receiver coupled to the microprocessor and operable to provide the microprocessor with data.]

[19. The radar detector of claim 18, further including a program storage device that is coupled to the microprocessor, the program storage device containing machine readable instructions for:

(a) determining the position of a radar detector; and (b) generating an alert if the position of the radar detector is not within a predetermined distance of a predetermined position.]

[20. The radar detector of claim 19, wherein the program storage device includes machine readable instructions for determining at least one characteristic of the radar signal.]

[21. The radar detector of claim 18, further including a program storage device that is coupled to the microprocessor, the program storage device containing machine readable instructions for:

(a) determining the velocity of the device utilized to detect the incoming radar signal; and (b) generating an alert if the velocity of a radar detector is greater than a predetermined velocity.]

*22. A method, performed by a radar detector for alerting an operator of a motor vehicle to an incoming police radar signal, the radar detector having a processor, the method comprising:*

*receiving first data that is based at least in part upon the incoming police radar signal;*

*receiving one of a pointing direction of the radar detector and a moving direction of the radar detector; and*

*alerting the operator of the motor vehicle to the incoming police radar signal;*

*wherein the receiving first data and the receiving the one of the pointing direction of the radar detector and the moving direction of the radar detector are both performed by the radar detector's processor.*

*23. The method of claim 22, further comprising generating a visual indication based at least in part upon the one of the pointing direction of the radar detector and the moving direction of the radar detector.*

*24. The method of claim 23, wherein the one of the pointing direction of the radar detector and the moving direction of the radar detector is determined based at least in part upon data received from a GPS satellite, wherein the radar detector includes non-volatile memory, and wherein the method includes storing a position of the radar detector in the non-volatile memory.*

*25. The method of claim 24, wherein the radar detector has a velocity, the method further comprising generating an alert if the velocity of the radar detector is greater than a predetermined velocity.*

*26. The method of claim 24, wherein the radar detector has a velocity, the method further comprising generating an alert if the velocity of the radar detector is greater than a velocity that was programmed by the operator of the radar detector.*

*27. The method of claim 23, wherein the radar detector includes a database of positions.*

*28. The method of claim 23, wherein the radar detector includes a database of positions that was provided for a fee.*

*29. The method of claim 23, wherein the radar detector includes a database of positions that was provided over the Internet.*

*30. The method of claim 23, wherein the radar detector includes a database of positions that was provided over the Internet for a fee.*

*31. The method of claim 23, wherein the radar detector has a velocity, the method further comprising generating an alert if the velocity of the radar detector is greater than a predetermined velocity.*

*32. The method of claim 23, wherein the radar detector has a velocity, the method further comprising muting an alert if the velocity of the radar detector is less than a predetermined velocity.*

*33. The method of claim 23, wherein the radar detector has a velocity, the method further comprising generating an alert if the velocity of the radar detector is greater than a velocity that was programmed by the operator of the radar detector.*

*34. The method of claim 23, wherein the radar detector has a velocity, the method further comprising muting an alert if the velocity of the radar detector is less than a velocity that was programmed by the operator of the radar detector.*

*35. The method of claim 23, wherein the radar detector has a position, the method further comprising generating an alert based at least in part upon the position of the radar detector.*

*36. The method of claim 22, further comprising generating a sound based at least in part upon the one of the pointing direction of the radar detector and the moving direction of the radar detector.*

*37. The method of claim 22, wherein the method further includes locating the approximate position of a source of an incoming radar signal.*

*38. A radar detector for alerting an operator of a motor vehicle to an incoming police radar signal, the radar detector comprising:*

*an antenna that receives the incoming police radar signal;*

*an alert circuit that alerts the operator of the motor vehicle to the incoming police radar signal;*

*a processor, the processor receiving first data that is based at least in part upon the incoming police radar signal, the processor receiving one of a pointing direction of the radar detector and a moving direction of the radar detector; and*

*a display that generates a visual indication based at least in part upon the one of the pointing direction of the radar detector and the moving direction of the radar detector.*

*39. The radar detector of claim 38, wherein the one of the pointing direction of the radar detector and the moving direction of the radar detector was determined based at least in part upon data received from a GPS satellite.*

*40. The radar detector of claim 38, wherein the one of the pointing direction of the radar detector and the moving direction of the radar detector was determined based at least in part upon data received from a GPS satellite and wherein the radar detector includes non-volatile memory that stores a position of the radar detector.*

*41. The radar detector of claim 38, wherein the radar detector generates a visual indication based at least in part upon a position of the radar detector.*

*42. The method of claim 38, wherein the radar detector includes a database of positions.*

*43. The method of claim 38, wherein the radar detector includes a database of positions that was provided for a fee.*

*44. The method of claim 38, wherein the radar detector includes a database of positions that was provided over the Internet.*

*45. The method of claim 38, wherein the radar detector includes a database of positions that was provided over the Internet for a fee.*

*46. The radar detector of claim 38, wherein the radar detector has a velocity and the radar detector generates an alert if the velocity of the radar detector is greater than a predetermined velocity.*

*47. The radar detector of claim 38, wherein the radar detector has non-volatile memory and a button, and the radar detector stores a position in the non-volatile memory if the operator depresses the button in excess of 1 second.*

*48. The radar detector of claim 38, wherein the radar detector has a velocity and the radar detector generates an alert if the velocity of the radar detector is greater than a velocity that was programmed by the operator of the radar detector.*

*49. The radar detector of claim 38, wherein the radar detector includes a database of positions that was provided over the Internet and the radar detector locates the approximate position of a source of an incoming radar signal.*

*50. The radar detector of claim 38, wherein the radar detector generates a sound based at least in part upon the one of the pointing direction of the radar detector and the moving direction of the radar detector.*

* * * * *

US00RE41905C1

(12) EX PARTE REEXAMINATION CERTIFICATE (9916th)

United States Patent
Fleming, III

(10) Number: US RE41,905 C1
(45) **Certificate Issued: *Nov. 1, 2013**

(54) INTELLIGENT RADAR DETECTOR

(76) Inventor: Hoyt A. Fleming, III, Boise, ID (US)

Reexamination Request:
No. 90/012,692, Sep. 15, 2012

Reexamination Certificate for:

| | |
|---|---|
| Patent No.: | **Re. 41,905** |
| Issued: | **Nov. 2, 2010** |
| Appl. No.: | **11/924,352** |
| Filed: | **Oct. 25, 2007** |

( * ) Notice: This patent is subject to a terminal disclaimer.

Related U.S. Patent Documents

Reissue of:

| | |
|---|---|
| (64) Patent No.: | **6,204,798** |
| Issued: | **Mar. 20, 2001** |
| Appl. No.: | **09/292,089** |
| Filed: | **Apr. 14, 1999** |

Related U.S. Application Data

(63) Continuation of application No. 11/196,841, filed on Aug. 2, 2005, now Pat. No. Re. 40,653, which is a continuation of application No. 10/352,679, filed on Jan. 28, 2003, now Pat. No. Re. 39,038.

(51) Int. Cl.
*G01S 7/40* (2006.01)

(52) U.S. Cl.
USPC ..... 342/20; 342/195; 342/357.22; 342/52; 342/89

(58) Field of Classification Search
None
See application file for complete search history.

(56) References Cited

To view the complete listing of prior art documents cited during the proceeding for Reexamination Control Number 90/012,692, please refer to the USPTO's public Patent Application Information Retrieval (PAIR) system under the Display References tab.

*Primary Examiner* — Ovidio Escalante

(57) ABSTRACT

A radar detector for alerting an operator of a motor vehicle to an incoming police radar signal. This radar detector includes a microprocessor; a circuit coupled to the microprocessor for detecting the incoming police radar signal; and a global positioning system receiver coupled to the microprocessor. Upon detection of an incoming radar signal, the radar detector can utilize the position, velocity, and/or heading data from the global positioning system receiver to determine whether to generate an alert.

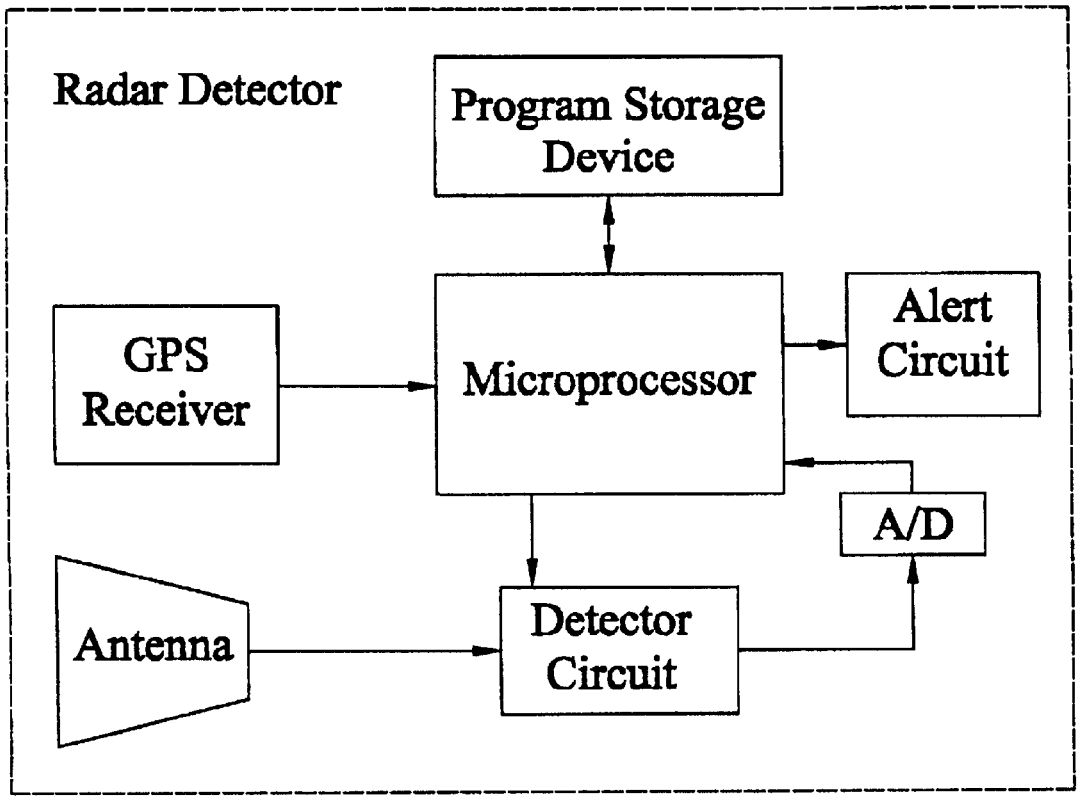

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 24, 25, 26, 32-34, 36, 39, 40, 47 and 48 is confirmed.

Claims 1-21 were previously cancelled.

Claims 22, 23, 27-31, 35, 37, 38, 41-46, 49 and 50 are cancelled.

* * * * *